United States Patent
Guo et al.

(10) Patent No.: US 11,618,117 B2
(45) Date of Patent: Apr. 4, 2023

(54) FREEZING SUPPORT DEVICE AND METHOD FOR LARGE THIN-WALLED PART

(71) Applicant: DALIAN UNIVERSITY OF TECHNOLOGY, Liaoning (CN)

(72) Inventors: Jiang Guo, Liaoning (CN); Yongbo Xu, Liaoning (CN); Yan Bao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 148 days.

(21) Appl. No.: 17/424,418

(22) PCT Filed: Feb. 17, 2020

(86) PCT No.: PCT/CN2020/075484
§ 371 (c)(1),
(2) Date: Jul. 20, 2021

(87) PCT Pub. No.: WO2020/168994
PCT Pub. Date: Aug. 27, 2020

(65) Prior Publication Data
US 2022/0097187 A1   Mar. 31, 2022

(30) Foreign Application Priority Data
Feb. 19, 2019 (CN) .......................... 201910123624.5

(51) Int. Cl.
*B23Q 3/08* (2006.01)
*B25J 15/00* (2006.01)

(52) U.S. Cl.
CPC .......... *B23Q 3/086* (2013.01); *B25J 15/0076* (2013.01)

(58) Field of Classification Search
CPC ........ B25J 15/0076; B25B 11/00; B23Q 3/08; B23Q 3/086; B23Q 1/035; B23Q 1/037
See application file for complete search history.

(56) References Cited

U.S. PATENT DOCUMENTS 5,357,762 A    10/1994  Charton
5,452,932 A *   9/1995  Griffin ................ B25J 15/0076
                                                      901/30

FOREIGN PATENT DOCUMENTS

CN    206405772 U    8/2017
CN    108127424 A    6/2018
(Continued)

OTHER PUBLICATIONS

Office Action (with English translation) corresponding to Chinese application No. 201910123624.5 dated Jul. 3, 2020. (pp. 7).
(Continued)

*Primary Examiner* — Tyrone V Hall, Jr.
(74) *Attorney, Agent, or Firm* — Muncy, Geissler, Olds & Lowe, P.C.

(57) ABSTRACT

A freezing support device and method for a large thin-walled part, which belongs to the technical field of machining support. The present invention realizes freezing support for a large thin-walled part by a freezing system and an auxiliary system, wherein the freezing system comprises a heating source, a freezing source, flexible films, support plates, etc., and the auxiliary system comprises a rotating device, a moving plate and guide rails. The present invention utilizes ice with a certain thickness formed on a support side of a machining area and supports a workpiece through the ice, and the ice is always used as a support along with the progress of machining to have an effect of follow-up support. The present invention simplifies a support structure, and has the advantages of low cost, no contamination to a (Continued)

machine tool, and convenient use; plays a function of clamping the workpiece.

2 Claims, 1 Drawing Sheet

(56) References Cited

FOREIGN PATENT DOCUMENTS

| | | |
|---|---|---|
| CN | 106334960 B | 8/2018 |
| CN | 108555644 A | 9/2018 |
| CN | 109894888 A | 6/2019 |
| DE | 29909410 U1 | 5/2000 |
| WO | WO-2018045463 A1 * | 3/2018 ............. B23Q 1/035 |

OTHER PUBLICATIONS

Notification of Grant (with English translation) corresponding to Chinese application No. 201910123624.5 dated Sep. 3, 2020. (pp. 5).

* cited by examiner

FREEZING SUPPORT DEVICE AND METHOD FOR LARGE THIN-WALLED PART

TECHNICAL FIELD

The present invention belongs to the field of machining, and relates to a freezing support device and method for a large thin-walled part.

BACKGROUND

In recent years, due the advantages of light weight, material saving and strong integrity, large thin-walled parts are popularized in use, especially in the field of aerospace where the weight of a workpiece is strictly required. With the wide application of the large thin-walled parts, the machining thereof becomes a difficult problem. Large thin-walled parts have poor rigidity and strength and are easy to deform during machining, which influences the dimensional accuracy, shape accuracy, position accuracy and surface roughness of a workpiece, and therefore it is difficult to ensure the machining quality of a part.

At present, in order to reduce the deformation of the large thin-walled parts during machining, the large thin-walled parts are mainly machined by mirror image machining technology, and are mainly supported by the methods of flexible support and follow-up support. For example, a mirror image milling follow-up jacking support device and method for thin-walled parts (with a patent publication number of CN108127424A), of which the main principle is that during milling of a large thin-walled part, a plurality of support heads are controlled by a program to realize an effect of follow-up support; and a flexible pneumatic variable-rigidity follow-up push head used for mirror milling (with a patent publication number of CN106334960B), of which the main principle is to use a cylinder and a universal ball to realize an effect of flexible support. Although the support method has achieved the purpose of reducing deformation, the support method is complex and requires a five-axis machine tool, which is expensive; in addition, the movement of the support heads will have certain delay during machining, which will influence the machining; at the same time, due to the movement of the support heads relative to the large thin-walled part, the support heads may cause scratches on a support surface and damage the support surface; and because the support method depends on a five-axis machine tool, the space occupied thereby is large.

To sum up, although a number of support methods for large thin-walled parts are available at present, the support methods are complex and have corresponding problems, therefore, how to realize high-efficient, convenient, rapid and simple support of a large thin-walled part has become a major problem in the field of machining.

SUMMARY

In order to solve the above problem, the present invention provides a freezing support device and method for a large thin-walled part, of which the main principle is to realize freezing support for a large thin-walled part by a freezing system and an auxiliary system. The present invention utilizes ice with a certain thickness formed on a support side of a machining area and supports a workpiece through the formed ice, and the ice is always used as a support along with the progress of machining to have an effect of follow-up support. The freezing support method has simple requirements on equipment and does not need large equipment. Compared with the traditional support method, the present invention plays a function of clamping the workpiece, but will not generate a clamping force or cause clamping deformation in the process of workpiece supporting; the support method has an effect of follow-up support, and can be used for supporting a large workpiece; and the present invention will not damage the support surface of the workpiece, but will protect the support surface. The method is based on the fluidity of water; as water can form any shape and can better adapt to machining requirements, the method can realize support of a curved surface with an arbitrary curvature.

To achieve the above purpose, the present invention adopts the following technical solution:

A freezing support device for a large thin-walled part, comprising a freezing system and an auxiliary system.

The freezing system comprises a heating source 9, a freezing source 14, water 13, flexible films 8 and support plates 7. The heating source 9 and the freezing source 14 are installed on the support plates 7, the flexible films 8 are connected to the support plates 7, and the water 13, the heating source 9 and the freezing source 14 are stored in a closed area formed between the flexible films 8 and the support plates 7. The main function of the water 13 is to provide a basis for freezing. The heating source 9 is mainly capable of providing heat to melt ice 10. The main function of the freezing source 14 is to make the water 13 rapidly turned into the ice 10. The flexible films 8 are flexible bags with the shape changing with the change of forces, and are used for storing the water 13. The support plates 7 are mainly used for providing substrates for the heating source 9, the freezing source 14, the water 13 and the flexible films 8. The support plates 7 are connected to piston rods 15.

The auxiliary system mainly comprises a rotating device, a moving plate 3 and guide rails, and is used for realizing the movement of the support plates 7 in X, Y and Z directions. The rotating device is formed by connecting two completely identical hydraulic prop devices (recorded as A and B hydraulic prop devices) together; the left end of each hydraulic prop device is connected to each support plate 7, the right end of each hydraulic prop device is connected to the moving plate 3, and the inner parts of the hydraulic prop devices are used for holding hydraulic fluid 5; pistons 6 and the piston rods 15 are arranged in sequence on the left end of the hydraulic fluid 5, and a controller is used to control the reciprocating motion of the piston rods 15 by controlling the inlet and outlet of the hydraulic fluid 5 in the hydraulic prop devices, so as to realize the movement of the support plates 7 in Z direction, and thereby ensuring that the positions of the support plates 7 relative to a tool nose spot are unchanged. The interval between the support plates 7 and a large thin-walled part 12 shall be greater than the minimum thickness of the ice 10 formed, the minimum thickness of the ice 10 need to meet machining requirements, and a support force provided by the ice 10 with the minimum thickness shall be equal to a cutting force. The rotating device can rotate around the axes of the A and B hydraulic prop devices. The moving plate 3 is a plate with a right side connected to the Y guide rail 1, and is mainly used for providing support for the rotating device in X direction. The guide rails are connected to a servo system, and comprise a Y guide rail 1 and a Z guide rail 2; the moving plate 3 is installed on the Y guide rail 1, and the Y guide rail 1 can move on the Z guide rail 2, so that the movement of the moving plate 3 in Y and Z directions can be realized.

plays a function of supporting the large thin-walled part 12, and an icing area is recorded as an "A icing area".

Step 2: when machining begins, machining the "A icing area" with a cutter 11 first; at this time, the freezing source 14 on the support plate 7 connected to the B hydraulic prop device 16 operates for refrigeration, so as to turn the water 13 between a B support plate 7 and a B flexible film 8 into the ice 10, and an icing area is recorded as a "B icing area"; in this process, icing of the water 13 in the "B icing area" is completed before the machining of the "A icing area" is completed.

Step 3: when the cutter 11 is used for machining the "B icing area", making the heating source 9 on the support plate 7 connected to the A hydraulic prop device 4 operate, so as to melt part of the ice 10 in the "A icing area".

Step 4: making the rotating device rotate around the axis of the B hydraulic prop device 16, and making the A hydraulic prop device 4 move to a next area to be machined, so as to form a next "A icing area".

Step 5: controlling the guide rails to move, so as to make the moving plate 3 be right in the center of the rotating device.

Step 6: when the cutter 11 is used for machining the "A icing area", making the heating source 9 on the support plate 7 connected to the B hydraulic prop device 16 operate, so as to melt part of the ice 10 in the "B icing area".

Step 7: making the rotating device rotate around the axis of the A hydraulic prop device 4, and making the B hydraulic prop device 16 move to a next area to be machined, so as to form a next "B icing area".

Step 8: repeating step 3 to step 7, until the machining of the large thin-walled part 12 is completed.

Compared with the prior art, the present invention has the following beneficial effects: the method simplifies a support structure, has simple requirements on equipment, saves device space, and has low costs; the support method plays a function of clamping the workpiece, but will not generate a clamping force or cause clamping deformation in the process of workpiece supporting; the support method belongs to follow-up support during machining, and meets the requirements for supporting a large workpiece; the support method avoids the problem of causing scratches on a support surface, and protects the support surface; the method is based on the fluidity of water; as water can form any shape, the method can realize support of a curved surface with an arbitrary curvature; the present invention adopts freezing support, and mainly utilizes the formation and melting of ice, so the method is clean and will not cause contamination to a machine tool.

Figure 1A:
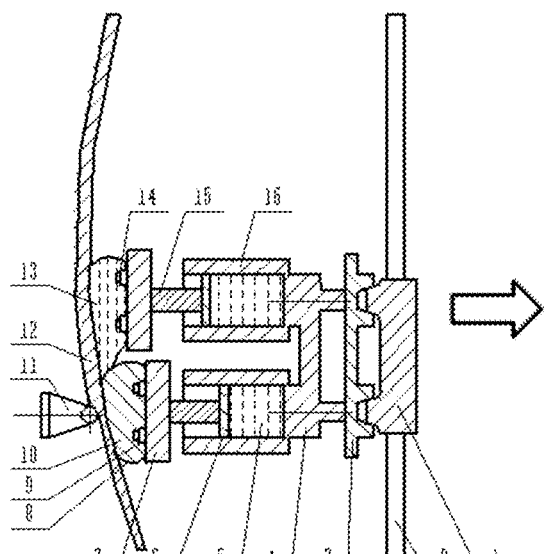
FIGS. 1(a) to 1(c) illustrate cross sectionals views of a freezing support device for a large thin-walled part of the present invention during operation.
Figure 1B:
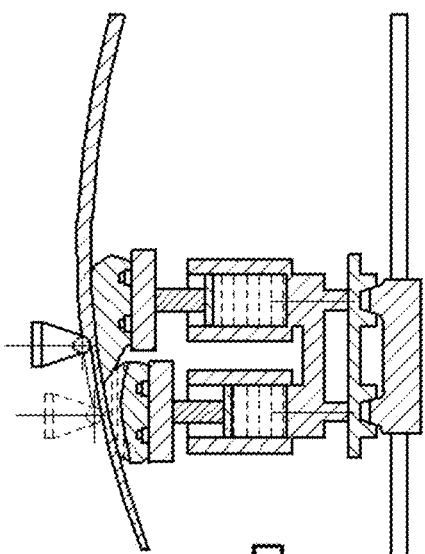
Figure 1C:
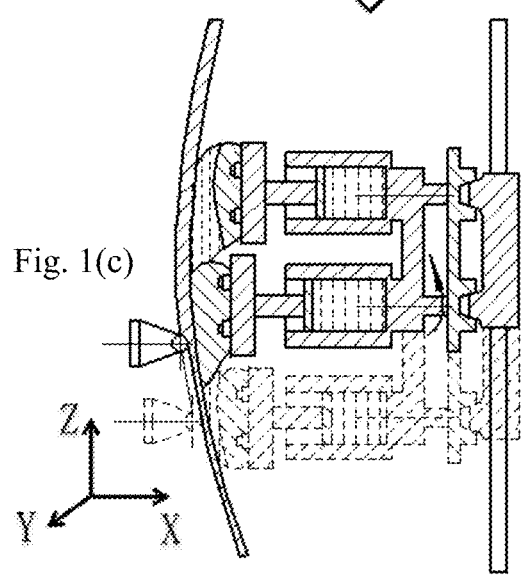

In the figures: 1 Y guide rail; 2 Z guide rail; 3 moving plate; 4 A hydraulic prop device; 5 hydraulic fluid; 6 piston; 7 support plate; 8 flexible film; 9 heating source; 10 ice; 11 cutter; 12 large thin-walled part; 13 water; 14 freezing source; 15 piston rod; and 16 B hydraulic prop device.

DETAILED DESCRIPTION

Specific embodiments of the present invention are described below in detail in combination with the technical solution and accompanying drawings.

A freezing support device for a large thin-walled part, comprising a freezing system and an auxiliary system.

The freezing system comprises a heating source 9, a freezing source 14, water 13, flexible films 8 and support plates 7. The heating source 9 and the freezing source 14 are installed on the support plates 7, the flexible films 8 are connected to the support plates 7, and the water 13, the heating source 9 and the freezing source 14 are stored in a closed area formed between the flexible films 8 and the support plates 7. The main function of the water 13 is to provide a basis for freezing. The heating source 9 is mainly capable of providing heat to melt ice 10. The main function of the freezing source 14 is to make the water 13 rapidly turned into the ice 10. The flexible films 8 are flexible bags with the shape changing with the change of forces, and are used for storing the water 13. The support plates 7 are mainly used for providing substrates for the heating source 9, the freezing source 14, the water 13 and the flexible films 8. The support plates 7 are connected to piston rods 15.

The auxiliary system mainly comprises a rotating device, a moving plate 3 and guide rails, and is used for realizing the movement of the support plates 7 in X, Y and Z directions. The rotating device is formed by connecting two completely identical hydraulic prop devices (recorded as A and B hydraulic prop devices) together; the left end of each hydraulic prop device is connected to each support plate 7, the right end of each hydraulic prop device is connected to the moving plate 3, and the inner parts of the hydraulic prop devices are used for holding hydraulic fluid 5; pistons 6 and the piston rods 15 are arranged in sequence on the left end of the hydraulic fluid 5, and a controller is used to control the reciprocating motion of the piston rods 15 by controlling the inlet and outlet of the hydraulic fluid 5 in the hydraulic prop devices, so as to realize the movement of the support plates 7 in Z direction, and thereby ensuring that the positions of the support plates 7 relative to a tool nose spot are unchanged. The interval between the support plates 7 and a large thin-walled part 12 shall be greater than the minimum thickness of the ice 10 formed, the minimum thickness of the ice 10 need to meet machining requirements, and a support force provided by the ice 10 with the minimum thickness shall be equal to a cutting force. The rotating device can rotate around the axes of the A and B hydraulic prop devices. The moving plate 3 is a plate with a right side connected to the Y guide rail 1, and is mainly used for providing support for the rotating device in X direction. The guide rails are connected to a servo system, and comprise a Y guide rail 1 and a Z guide rail 2; the moving plate 3 is installed on the Y guide rail 1, and the Y guide rail 1 can move on the Z guide rail 2, so that the movement of the moving plate 3 in Y and Z directions can be realized.

A freezing support method for a large thin-walled part, wherein the method is realized based on the freezing system and the auxiliary system and comprises the following steps:

Step 1: when machining is not carried out, making the freezing source 14 on the support plate 7 connected to the A hydraulic prop device 4 operate for refrigeration, so as to turn the water 13 between an A support plate 7 and an A flexible film 8 into the ice 10; at this time, the ice 10 formed plays a function of supporting the large thin-walled part 12, and an icing area is recorded as an "A icing area".

Step 2: when machining begins, machining the "A icing area" with a cutter 11 first; at this time, the freezing source 14 on the support plate 7 connected to the B hydraulic prop device 16 operates for refrigeration, so as to turn the water 13 between a B support plate 7 and a B flexible film 8 into the ice 10, and an icing area is recorded as a "B icing area"; in this process, icing of the water 13 in the "B icing area" is completed before the machining of the "A icing area" is completed.

Step 3: when the cutter 11 is used for machining the "B icing area", making the heating source 9 on the support plate 7 connected to the A hydraulic prop device 4 operate, so as to melt part of the ice 10 in the "A icing area".

Step 4: making the rotating device rotate around the axis of the B hydraulic prop device 16, and making the A hydraulic prop device 4 move to a next area to be machined, so as to form a next "A icing area".

Step 5: controlling the guide rails to move, so as to make the moving plate 3 be right in the center of the rotating device.

Step 6: when the cutter 11 is used for machining the "A icing area", making the heating source 9 on the support plate 7 connected to the B hydraulic prop device 16 operate, so as to melt part of the ice 10 in the "B icing area".

Step 7: making the rotating device rotate around the axis of the A hydraulic prop device 4, and making the B hydraulic prop device 16 move to a next area to be machined, so as to form a next "B icing area".

Step 8: repeating step 3 to step 7, until the machining of the large thin-walled part 12 is completed.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. A freezing support device for a thin-walled part, comprising a freezing system and an auxiliary system;
the freezing system comprises a heating source, a freezing sourced, water, flexible films and support plates; the heating source and the freezing source are installed on the support plates, the flexible films are connected to the support plates, and the water, the heating source and the freezing source are stored in a closed area formed between the flexible films and the support plates; the water is turned into ice by the freezing source, and the ice is melted by the heating source; the support plates are connected to piston rods; the interval between the support plates and a large thin-walled part is greater than the minimum thickness of the ice formed, the minimum thickness of the ice need to meet machining requirements, and a support force provided by the ice with the minimum thickness shall be equal to a cutting force;
the auxiliary system mainly comprises a rotating device, a moving plate and guide rails, wherein the guide rails are connected to a servo system and comprise a Y guide rail and a Z guide rail, and the auxiliary system is used for realizing the movement of the support plates in X, Y and Z directions; the rotating device is formed by connecting two completely identical hydraulic prop devices, including an A hydraulic prop device and a B hydraulic prop device, together, to form A and B hydraulic prop devices, and the rotating device can rotate around the axes of the A and B hydraulic prop devices; the left end of each of the hydraulic prop devices is connected to each support plate, the right end thereof is connected to the moving plate, and the inner parts of the hydraulic prop devices are used for holding hydraulic fluid; pistons and the piston rods are arranged in sequence on the left end of the hydraulic fluid, and a controller is used to control the reciprocating motion of the piston rods by controlling the inlet and outlet of the hydraulic fluid in the hydraulic prop devices, so as to realize the movement of the support plates in Z direction, and thereby ensuring that the positions of the support plates relative to a tool nose spot are unchanged; the moving plate is a tabular structure with a right side connected to the Y guide rail, and provides support for the rotating device in X direction.

2. A freezing support method for a large thin-walled part, wherein the method is realized based on the freezing system and the auxiliary system and comprises the following steps:
step 1: when machining is not carried out, making the freezing source on the support plate connected to the A hydraulic prop device operate for refrigeration, so as to turn the water between an A support plate and a flexible film into the ice; at this time, the ice formed plays a function of supporting the large thin-walled part, and an icing area is recorded as an "A icing area";
step 2: when machining begins, machining the "A icing area" with a cutter first; at this time, the freezing source on the support plate connected to the B hydraulic prop device operates for refrigeration, so as to turn the water between a B support plate and a B flexible film into the ice, and an icing area is recorded as a "B icing area"; in this process, icing of the water in the "B icing area" is completed before the machining of the "A icing area" is completed;
step 3: when the cutter is used for machining the "B icing area", making the heating source on the support plate connected to the A hydraulic prop device operate, so as to melt part of the ice in the "A icing area";
step 4: making the rotating device rotate around the axis of the B hydraulic prop device, and making the A hydraulic prop device move to a next area to be machined, so as to form a next "A icing area";
step 5: controlling the guide rails to move, so as to make the moving plate be right in the center of the rotating device;
step 6: when the cutter is used for machining the "A icing area", making the heating source on the support plate connected to the B hydraulic prop device operate, so as to melt part of the ice in the "B icing area";
step 7: making the rotating device rotate around the axis of the A hydraulic prop device, and making the B hydraulic prop device move to a next area to be machined, so as to form a next "B icing area";
step 8: repeating step 3 to step 7, until the machining of the large thin-walled part is completed.

* * * * *